Sept. 23, 1969 J. O. KELLEY 3,468,497

ROLLER OR CAPSTAN FOR TAPE HANDLING SYSTEM

Filed Feb. 14, 1968

INVENTOR
JERRY O. KELLEY
BY
Marechal, Biebel, French & Bugg
ATTORNEYS

United States Patent Office 3,468,497
Patented Sept. 23, 1969

3,468,497

ROLLER OR CAPSTAN FOR TAPE HANDLING SYSTEM

Jerry O. Kelley, Columbus, Ind., assignor to Arvin Industries, Inc., Columbus, Ind., a corporation of Indiana Filed Feb. 14, 1968, Ser. No. 705,405
Int. Cl. G11b *15/44;* B65h *27/00*
U.S. Cl. 242—192 7 Claims

ABSTRACT OF THE DISCLOSURE

A tape handling system includes a roller or capstan having a rigid guide flange at one end and a guide flange at the other end having independently flexible fingers each separately engageable with an edge of the tape to urge the tape against the rigid flange.

BACKGROUND OF THE INVENTION

In a tape handling system, such as used in data processing equipment or magnetic recording equipment, a rotatable capstan is used to drive the tape from a supply to a take-up. Other supplemental equipment may be involved, but generally speaking the capstan provides the closely controlled tape velocity which is necessary, for example, when moving magnetic recording tape past a magnetic recording/playback transducer. It has been known to provide capstans with both rigid and resilient surfaces, and to provide them with or without guiding flanges to align the tape on the capstan surface.

In some instances guide rollers with flanges are employed to guide the tape to and from the capstan. It is known to provide such guide rollers, for example, with at least one movable flange that is spring loaded toward the roller in order to bias the tape toward the other end of the roller where a fixed flange provides a reference. In other tape guiding systems it has been known to use a one piece flexible flange which is arranged to press against the tape, however in this instance flexing of such a flange at one point produces counter forces in other parts of the flange which may oppose the desired biasing effect. This is particularly true where the tape may have to wrap around a substantial portion of the peripheral surface of the capstan.

SUMMARY OF THE INVENTION

According to the invention a tape guiding roller or the capstan is provided with a rigid flange at one of its ends, projecting somewhat outwardly from its surface portion, and serving as a reference against which one edge of the tape is guided. The other end of the capstan or roller is provided with a flexible flange construction which includes a plurality of independently flexible fingers, each extended radially beyond the peripheral face, and each independently capable of pressing against a portion of the tape edge to urge the tape against the opposite reference flange. Thus, if there are local slight inconsistencies in the tape width, the desired biasing force to maintain the reference position of the tape is maintained. Furthermore, in some forms of tape transport systems the take-up roll may engage the capstan directly and receive the tape directly from the capstan surface. In these instances both the rigid flange and the flexible fingers overlap the outer convolutions of the take-up roll and function to guide the tape onto the take-up, providing a smoothly and evenly wound roll. Again, the independently flexible fingers can accommodate any local inconsistencies in the roll without reflecting undesired forces into other parts of the flexible guiding flanges.

Accordingly, the object of this invention is to provide a novel capstan or guide roller construction for a tape handling system wherein there is a flexible guiding flange comprising a plurality of independently flexible fingers extending radially outward from the peripheral surface of the roller or capstan, and wherein such fingers act independently on edge portions of the tape to urge the tape into a reference position as it is moved through the system and over the roller or capstan.

Other objects and advantages of the invention will be apparent from the following description, the accompanying drawing and the appended claims.

DESCRIPTION OF THE PREFERRED EMBODIMENT

Figure 1:
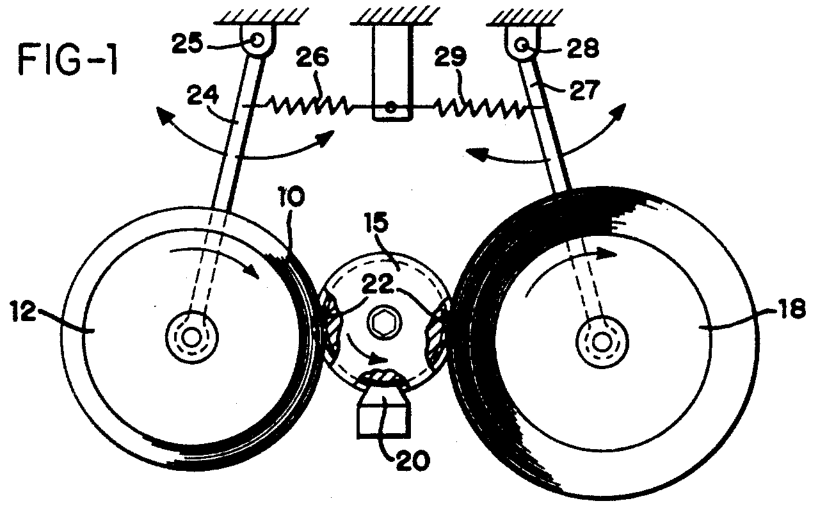
FIG. 1 is a diagrammatic illustration of one form of tape handling system incorporating the features of the present invention.

Referring to the drawing, which illustrates a preferred embodiment of the invention, FIG. 1 shows a typical tape transporting system to which the present invention is applicable. Details of such a system are described in the copending application of Kingston E. Ganske et al., Ser. No. 705,478 filed concurrently herewith, and entitled Tape Transport System. For purposes of illustration the details of the system have been omitted from FIG. 1 and only the major elements are shown.

The tape 10 is received from a supply roll 12, passes directly to and around the drive capstan 15, and onto the take-up roll 18. In passing over the capstan the tape is carried across a magnetic recording/playback head 20 which incorporates one or more transducers. In this arrangement the capstan 15 preferably is provided with a resilient surface portion 22. A swingable arm 24, pivotally mounted to the base at 25, carries the roll 12 and the outer convolutions of the roll are urged toward the capstan 15 by a spring 26.

In the aforementioned system, means are provided for holding the supply roll spaced somewhat from the capstan, however details of that means are omitted from FIG. 1 here, since they form no part of the present invention. A swingable arm 27, pivoted to the base at 28, mounts the take-up roll 18 which is urged toward and into contact with the capstan by the spring 29. The capstan is driven by a synchronous motor (not shown) which may be reversible in order to run the tape in either direction past the tape 20, in which case the rolls 12 and 18 function interchangeably as the supply or take-up depending upon the direction of operation.

Figure 3:
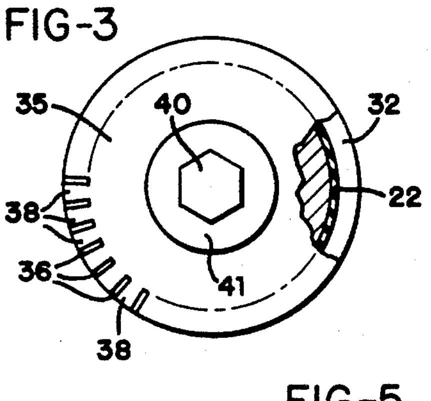
FIG. 3 is a top view of a flexible flange.
Figure 4:
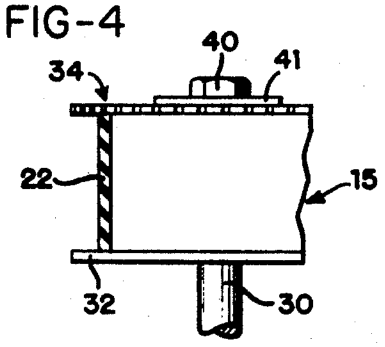
FIG. 4 is an enlarged view, partly in section, showing a portion of the capstan or guide roller and the associated flanges.

Referring to FIGS. 3 and 4, the capstan is mounted on a shaft 30 through which its rotary drive is transmitted from the motor, and the capstan includes at its lower end a rigid guide flange 32 which forms a reference to locate the tape precisely, such that the head 20 follows exactly a track on the tape. A flexible upper flange 34 is mounted to the upper or other end of the capstan, and comprises a disc-like member 35 having slots 36 formed in its outer edge, preferably extending radially, and defining between the slots a plurality of independently flexible fingers 38.

Figure 5:
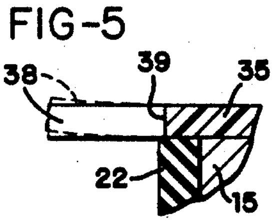
FIG. 5 is an enlarged detail view of one segment of the flexible flange, showing the manner in which the individual guide fingers function.

The root portion 39 of these fingers (FIG. 5) preferably is located radially inward of the surface of the resilient face portion of the capstan, thus the entire extent of the flange 34 beyond this surface portion is comprised of the independent flexible fingers. In a suitable construction, the flexible flange member 34 is formed of a synthetic plastic material known as Delrin. Other suitable materials for this purpose are nylon or other materials of that nature. As shown in FIG. 3, the flange can readily be fastened to the capstan by a retaining nut 40 tightened against a supporting washer 41 on the upper surface of the flange.

It has been found particularly in tape handling systems such as shown in FIG. 1, that it is desirable to locate the underside of the fingers 38 with respect to the upper surface of the rigid flange 32 by a distance slightly less than the width of the tape. For example, operating with tape of one half inch width, suitable results have been obtained by having this spacing in the order of 0.499 inch.

As the tape enters the capstan the fingers exert a spring-like force against one edge of the tape urging it into contact with the rigid flange 32, thereby maintaining an exact reference. This is particularly important where it is necessary to have precise guidance of the tape past the magnetic head 20. Where the tape leaves the capstan and passes to the take-up roll 18, the fingers 38 assist in laying the tape precisely upon the outermost convolution of the take-up roll, and also the fingers accommodate any local disturbances or misalignment without reflecting this as an opposite force to any other fingers or other part of the flange 34 which is acting to guide the tape. Thus any disturbance of one finger is localized and does not result in a counter force elsewhere in the peripheral edge of the flange.

Figure 2:
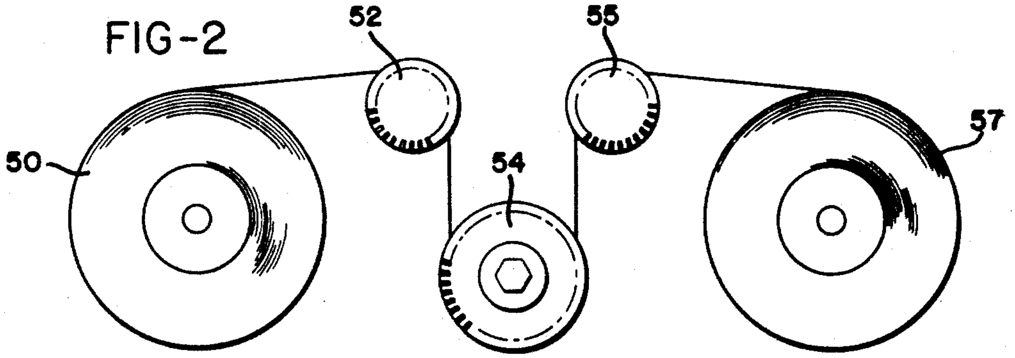
FIG. 2 is a diagrammatic illustration of another form of tape transporting system incorporating the invention.

FIG. 2 illustrates another form of tape transport system, wherein the tape from a supply such as a reel 50 passes to and around a guiding roller 52, and from the guiding roller over a capstan 54 to a further guiding roller 55, and thence to a take-up reel 57. In this system the capstan 54 may be fitted with a lower guiding flange and an upper slotted guiding flange, incorporating the independently flexible fingers as previously described. Alternatively, the capstan 54 may be constructed without guide flanges, and the rollers 52 and 55, or at least one of them, can be provided with the novel guide flange structure of the invention. It should be understood, therefore, that the invention is not limited to the provision of the flexible flange with independently flexible fingers only on a capstan, but this same type of guiding flange structure can also be applied to various forms of guiding rollers in tape transporting systems.

While the form of apparatus herein described constitutes a preferred embodiment of the invention, it is to be understood that the invention is not limited to this precise form of apparatus, and that changes may be made therein without departing from the scope of the invention.

What is claimed is:

1. In a tape handling system including a supply of flexible tape and a take-up onto which the tape is wound, the improvement comprising a rotatable cylindrical capstan, a first fixed tape guiding flange extending radially from one end of said capstan and providing a reference against which one edge of the tape is located in passing over a section of the peripheral face of said capstan, a second tape guiding flange means extending radially from the other end of said capstan and including a plurality of independently flexible fingers each engageable with the other edge of the tape.

2. A tape handling system as defined in claim 1, wherein said fingers are spaced from said fixed flange by a distance slightly less than the width of said tape.

3. A tape handling system as defined in claim 2, wherein the take-up is a roll arranged for continuous peripheral contact with the face of said capstan, said flexible flange fingers being capable of individual forced engagement over the edge of said roll without producing a reaction in others of the fingers.

4. A tape handling system as defined in claim 1, wherein said capstan includes a resilient member having a face portion for contacting the tape, and the connection between said fingers and the remainder of said second flange being radially inward of said face portion whereby only portions of said fingers contact the other edge of the tape while the tape is passing across said capstan.

5. In a tape handling system including a supply of flexible tape and a take-up onto which the tape is wound, the improvement comprising a rotatable cylindrical member having a face for receiving and guiding the tape, a first fixed tape guiding flange extending radially from one end of said member and providing a reference against which one edge of the tape is located in passing over the peripheral face of said member, a second tape guiding flange means extending radially from the other end of said member and including a plurality of independently flexible fingers each engageable with the other edge of the tape.

6. A tape handling system as defined in claim 5, wherein said fingers are spaced from said fixed flange by a distance slightly less than the width of said tape.

7. A tape handling system as defined in claim 5, wherein the connection between said fingers and the remainder of said second flange is radially inward of said face portion of said member whereby only portions of said fingers contact the other edge of the tape while the tape is passing across said member.

References Cited

UNITED STATES PATENTS

| | | | |
|---|---|---|---|
| 2,624,574 | 1/1953 | Camras | 226—183 X |
| 2,657,871 | 3/1953 | Pettus | 242—55.14 |
| 3,370,804 | 2/1968 | Peyton | 242—55.12 |

GEORGE F. MAUTZ, Primary Examiner

U.S. Cl. X.R.

226—190, 196; 242—76, 209